Nov. 22, 1955

L. A. AMTSBERG 2,724,299

TORQUE CONTROL CLUTCH DEVICE FOR THREADED
FASTENER SETTING TOOLS

Filed Nov. 6, 1953

INVENTOR
LESTER A. AMTSBERG.
BY
Raymond G. Mullee
ATTORNEY

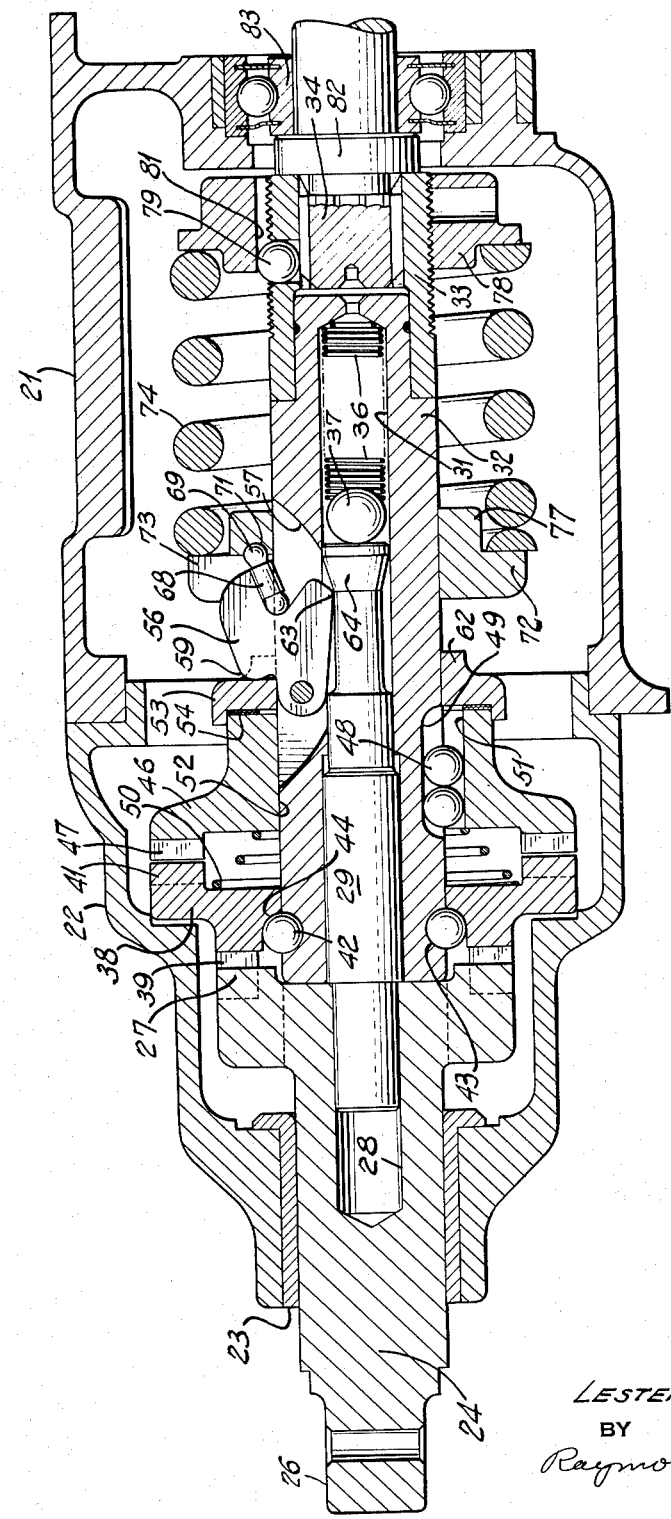

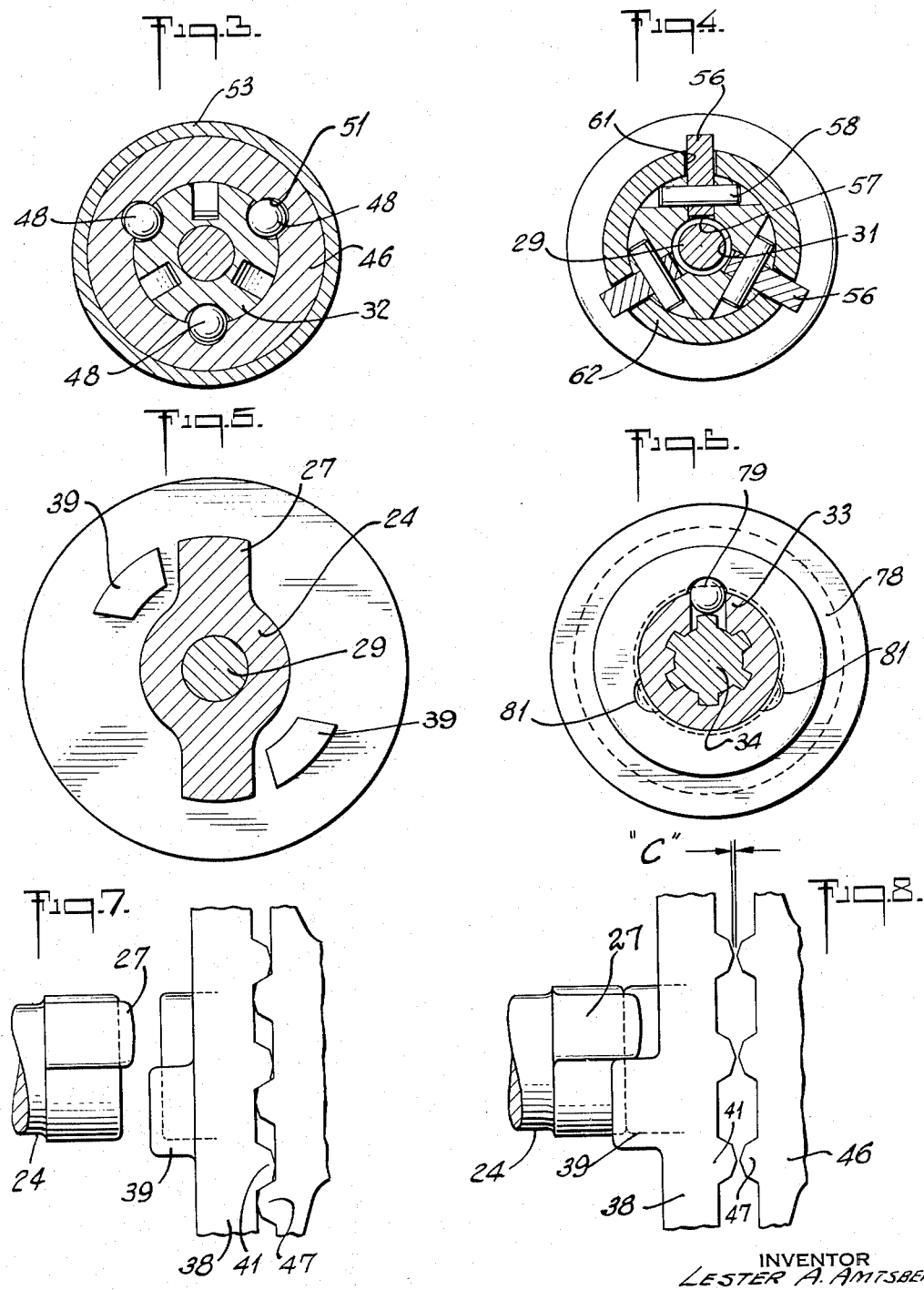

United States Patent Office 2,724,299
Patented Nov. 22, 1955

2,724,299

TORQUE CONTROL CLUTCH DEVICE FOR THREADED FASTENER SETTING TOOLS

Lester A. Amtsberg, Utica, N. Y., assignor to Chicago Pneumatic Tool Company, New York, N. Y., a corporation of New Jersey Application November 6, 1953, Serial No. 390,636

16 Claims. (Cl. 81—52.4)

This invention relates to a threaded fastener setting tool, and more particularly to a torque cut-off arrangement for such a tool.

In certain mass production work, wherein it is required to run up threaded fasteners in assembly operation, it is desirable to have a high speed tool which can be used to quickly set the fasteners, and run them up with a uniform final setting torque. Many of the tools designed to accomplish such work have clutch plates, or jaws, initially held in engagement by a compression spring but arranged to separate upon development of a predetermined torque. Very often such clutch arrangements are unsatisfactory because the clutch plates, after separation, re-engage with a ratcheting, or impacting action, due to the force of the compression spring. A tool embodying the principles of the subject invention avoids the disadvantages of prior art devices, and will be found most useful and satisfactory for threaded fastener setting operations.

The tool includes a pair of rotatable clutch elements having inter-engaging clutch teeth, formed to provide cam engaging surfaces. One of the clutch elements is power driven and is arranged in driving relationship to the other. The driving clutch element is slidable axially with respect to the driven element, which is coupled to a workpiece. A compression spring, acting through a plurality of toggle members, is adapted to urge the driving element in engaging relationship with the driven element. As resistance to rotation of the driven element increases, the driving clutch element is urged away from the driven clutch element due to the camming action of the inter-engaging teeth. When such disengaging force reaches a certain amount, corresponding to the predetermined cut-off torque for which the tool is set, the driving clutch element is moved in a disengaging direction. As a result the toggle members are forced past their dead-center position, thereby causing the inter-engaging clutch teeth to become further disengaged, thus discontinuing further rotation of the driven clutch element. Means are provided to automatically re-engage the clutch elements when desired, for further work operations.

The general object of this invention is to provide a threaded fastener setting tool with an automatic torque cut-off arrangement.

Another object is to provide an automatic torque cut-off arrangement which can be conveniently adjusted to cut-off at any predetermined value of torque within the range of the tool.

A further object is to provide an automatic torque cut-off for a tool wherein a plurality of toggle members form part of the torque cut-off arrangement.

Another object is to provide an automatic torque cut-off arrangement having inter-engaging clutch teeth which will not re-engage to cause ratcheting, or impacting, once the clutch teeth have been disengaged at predetermined cut-off load.

Another object is to provide an automatic torque cut-off clutch wherein the clutch teeth upon initial disengagement, are given an additional separating movement, thereby preventing ratcheting, or impacting, and thus avoiding rapid wear of the clutch teeth.

Still another object is to provide a threaded fastener setting tool with an automatic torque cut-off arrangement which will work equally well in either direction of rotation.

Another object is to provide a threaded fastener setting tool with an automatic torque cut-off arrangement which is simple in design, reliable in operation, and which will give long and economical performance.

These and further objects and features of the invention will become more apparent from an understanding of the following disclosure and the accompanying drawings wherein:

Fig. 2 is a longitudinal section view similar to Fig. 1, but showing the relative position of the parts, just after torque cut-off;

Figs. 3 to 6 are sectional views as seen from the respective section lines indicated in Fig. 1;

Fig. 7 is a fragmentary view, partly in development, showing the position of certain clutch elements in the condition of the tool as in Fig. 1;

Fig. 8 is a view similar to Fig. 7 but in the condition of the tool as in Fig. 2;

Figure 1:
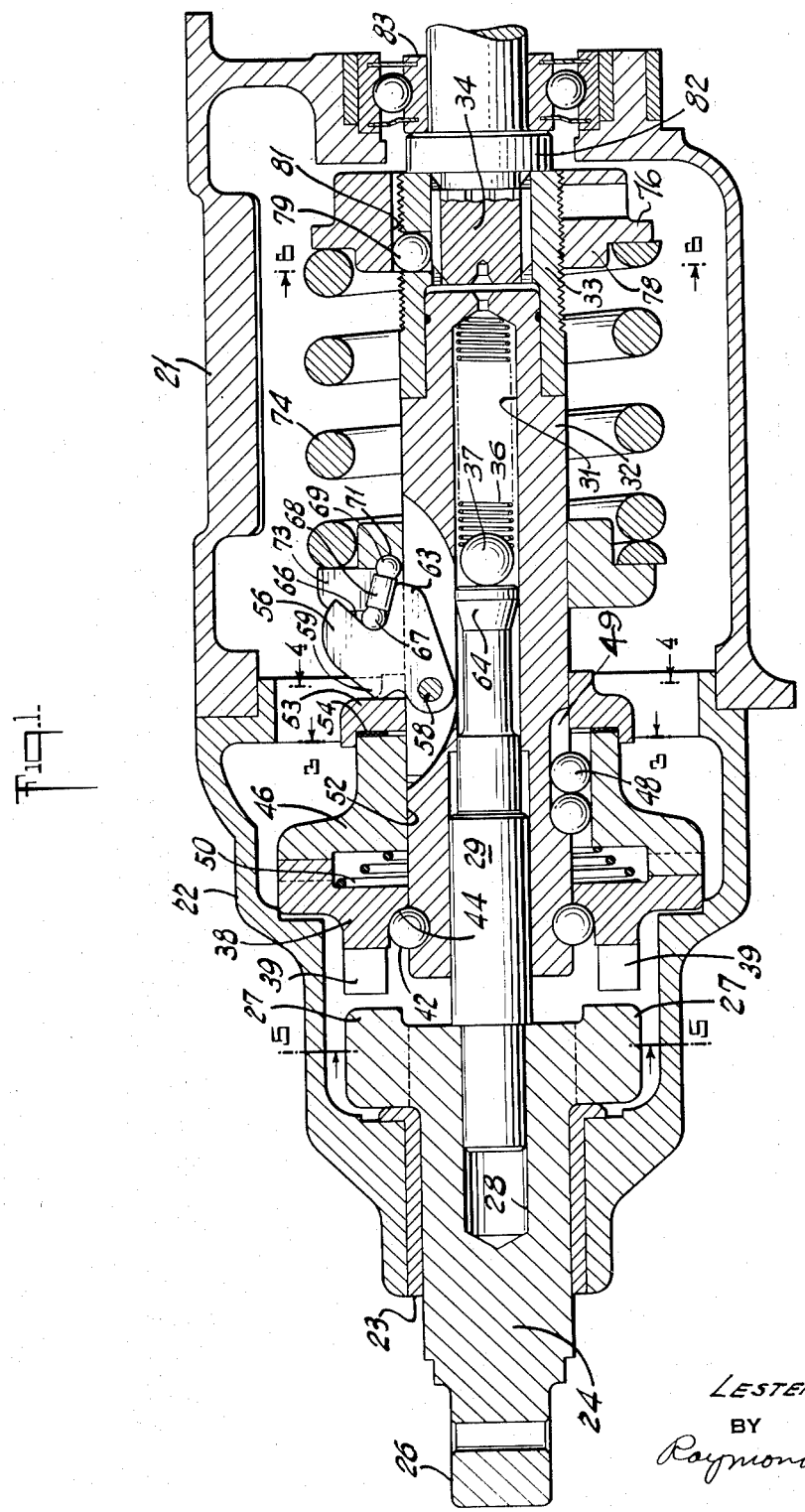
Fig. 1 is a longitudinal section view of an illustrative embodiment of the invention, and showing the relative position of the parts in normal, or pre-operative position.

Referring now to Fig. 1 of the drawings, numeral 21 indicates an intermediate housing of the tool, which is affixed in some manner to a motor housing which encases a power source, such as an electric or pneumatic motor (not shown). The forward end of the intermediate housing 21 affixedly supports a front housing portion 22, which maintains a bushing 23 arranged to slidingly support a forward driven member, or clutch shank 24. The clutch shank 24 is adapted at its front end 26 to receive a socket (not shown) for engaging a work piece, such as a nut, screw, or bolt head, and at the opposite end has a pair of clutch jaws 27, which are diametrically opposed as best seen in Fig. 5. Within the rear or inner end of the clutch shank 24 is arranged a bore hole 28, for receipt of the end of a cam shaft 29.

The cam shaft 29 extends into a bore 31 of a spindle 32 to thereby rotatably support the front end of the spindle. The other end of the spindle is affixed within a non-circular opening in an adjustment bushing 33, which is spline-connected to an end of a power shaft 34 of the driving motor. Within the spindle bore 31, is arranged a compression spring 36, which abuts against the bottom of the bore 31 at the rear end, and against a ball 37 at the other end, the ball 37 being in contact with the end of the cam shaft 29, as shown. In such manner the clutch shank 24 is being constantly urged forward, or toward the bushing 23.

Rotatably mounted on the forward end of the spindle 32, is an intermediate driven clutch element 38, which has on one side a pair of forwardly extending clutch jaws 39, adapted for engagement with the clutch shank jaws 27, and on the other side a plurality of rearwardly extending cam shaped clutch teeth 41 having two surfaces sloped at different degrees on each side of the tooth. A plurality of ball bearings 42, arranged in a groove 43 on the spindle 32, engage a raceway 44 formed in the driven clutch element 38, to limit forward movement of the latter upon the spindle 32. A driving clutch element 46, slidably mounted upon the spindle 32, has a plurality of forwardly extending cam shaped clutch teeth 47, having two surfaces sloped at different degrees on each side of the tooth, and which are adapted for engagement with, and similar to, the driven clutch teeth 41. In teeth 41, 47, the less steeply shaped top portions serve to provide easy re-engagement of the clutch teeth, as will be more fully understood. A pair of ball bearings 48, disposed in each of three equi-angularly spaced grooves 49 formed on the spindle 32, engage longitudinal circular grooves 51 formed on the inner periphery 52 of the driving clutch element 46, so that the latter is driven by spindle 32 but may move axially upon the spindle for purposes of disengaging the clutch teeth (47, 41). Compressively maintained between the clutch elements 38, 46 is a conical spring 50, which constantly urges the driving clutch element 46 away from the driven clutch element 38, and at the same time keeps the latter in engagement with the ball bearings 42.

Surrounding the rear end of the driving clutch element 46, and in engagement therewith, is an abutment cap 53, which is slidingly arranged on the spindle 32. Annular shims 54 may be arranged between the cap 53 and the end of the driving clutch element 46, to adjust the clutch teeth (41, 47) clearance as indicated in Fig. 8.

Pivotally mounted on the spindle 32, and arranged to swing in radial planes, are three equi-angularly spaced toggle levers 56. Longitudinal slots 57 are formed in the spindle to accommodate the levers 56, said slots opening into the spindle bore 31, while pivot pins 58 are arranged in the spindle transversely to the slots for pivotally supporting the toggle levers, all as shown in Figs. 1 and 4. A nose or corner edge 59 of each toggle lever is adapted to abut the back surface of the abutment cap 53. The nose portions are guided in slots 61 provided in a hub 62 of the abutment cap, for reception of each toggle lever. Another corner edge 63 of each toggle lever is adapted to engage the cam shaft 29 when the toggle levers are extending through the slots 57, as illustrated in Fig. 2. The cam shaft 29, has a conical cam portion 64, which is arranged to engage the corner edges 63 of the toggle levers, the reason for which will be more apparent later.

Between the corner edges 59, 63 of each toggle lever is arranged a V-shaped groove 66, the apex of which is rounded to receive a spherical end 67 of a toggle member, or pin, 68. The opposite or rearward end 69 of each toggle member is spherical and engages a socket recess 71 formed in a spring plate 72. The spring plate is slidably mounted upon the spindle, and has three radial grooves 73, which receive and positionally maintain part of the toggle levers 56, and the toggle members 68.

A compression spring 74 is arranged at its front end to abut the spring plate 72, and to abut at the other end an adjustment plate 76, which is threadably affixed to the adjusting bushing 33. Shoulders 77, 78 are provided on the spring plate 72 and adjustment plate 76, respectively, so that the compression spring 74 is maintained concentric with the spindle 32. For purposes of regulating the stress of the compression spring 74, and the point of torque cut-off as will be later seen, the adjustment plate 76 can be locked in adjusted position upon the adjusting bushing 32 by means of a ball member 79, positioned in the bushing which extends into one of three grooves 81 formed on an inner periphery of the adjustment plate. For adjustment purposes, the adjusting bushing 33 along with the clutch elements must of course be moved from the motor shaft 34 sufficiently to allow the ball 79 to drop out of engagement with the groove 81. The end of the adjusting bushing 33 is arranged to abut a shoulder 82 formed on the motor shaft, while on the opposite side of the shoulder a ball bearing assembly 83 is positionally maintained in the housing 21.

It will be seen that with the parts in the relative positions as seen in Fig. 1, the compressive force of the spring 74 exerts a force on the toggle members 68, so that the lines of action (coincident with the center line of the toggle members) are divergent outwardly from the pivot pin 58, thereby tending to swing toggle levers 56 counter-clockwise and causing the toggle lever corner edges 59 to force the abutment cap 53, and hence the driving element 46 forwardly. Forward pressure on the driving element 46 holds the clutch teeth 47 of the latter in engagement with the clutch teeth 41 of the driven clutch element 38. With the parts in the relative position as seen in Fig. 2, the compressive force of the spring 74 exerts a force on the toggle members 68, so that the lines of action are divergent inwardly slightly from the pivot pin 58, thereby tending to swing toggle levers 56 clockwise and releasing forward pressure on the driving element 46. This in turn allows conical spring 50 to urge the driving element away from the driven element 38, so that the clutch teeth thereof are completely disengaged. It will be observed, that in the Fig. 2 position, the corner edges 63 of the toggle levers project into the path of travel of the conical cam portion 64 of the cam shaft.

Considering now the operation of the tool, assume that the relative position of the tool parts are as illustrated in Fig. 1 and that the tool motor is in operation. The spindle 32 is rotating by virtue of connection with the motor shaft, thereby rotating the toggle members 56, as well as the driving element 46, and engaged driven element 38. The operator then engages a work piece, i. e., nut, screw, or bolt that is to be set (not shown) by the tool socket, and in so doing forces the clutch shank 24 rearwardly, relative to the other parts of the tool, against the pressure of spring 36, thereby engaging clutch jaws 39 and 27, resulting in the rotation of the clutch shank 24, and the running up of the work piece. At this time the torque is delivered through the base portions of the teeth 47, 41. Due to the cam shape of said base portions, the reactive force of driven teeth 41 on driving teeth 47 is resolved into two components: one in a rotational direction to resist further turning, and the other in an axial direction to tend to move the driving element rearward. During the early stages of work run-up, the resistance to rotation is small, with a correspondingly small torque reaction and axial component of force, and the compression spring 74 is effective to keep the clutch teeth 41, 47 fully engaged. As the resistance to rotation increases, the axial component of reactive force between the clutch teeth correspondingly rises to force the driving clutch element 46, away from the driven clutch element 38, against the resistance of the compression spring 74, and causes compression of the latter. When the work piece is finally seated, and/or the tool output torque approaches the predetermined cut-off value, the engaged clutch teeth 41, 47 are shifted toward disengagement with each other as relative motion occurs on the steeper shaped portions thereof.

During the separating movement of clutch driving member 46, lever 56 is rocked until the line of action of each toggle pin 68 passes inwardly of each pivot pin 58 axis, resulting in the snap over of each toggle lever 56 to the position shown in Fig. 2. In such position of the toggle levers 56, the compression force of spring 74 is exerted upon the cam shaft 29 instead of the driving element 46, so that the compressive force of the conical spring 50 will move the driving element 46 still further in a declutching direction whereby the clutch teeth 47 are completely disengaged from the clutch teeth 41 of the driven element 38. The force angles of the toggles are arranged so that the resisting moment decreases faster than the load on spring 74 increases, even at the start of disengagement between clutch teeth 41, 47. The advantage of such an arrangement is that the clutch teeth are subjected to less wear as a result of disengaging motion. The actual time required for disengagement of the clutch teeth after predetermined load is reached, depends upon the slope, or angle of the engaging teeth portions, and the degree of compression of spring 74.

In such position (Fig. 2) of the parts, the driving element 46 will continue to rotate due to direct connection with the spindle 32, but the driven element 38 will not be rotating due to disengagement of the clutch teeth 41 thereof from clutch teeth 47. The effect of the toggle action is to supplement the declutching movement caused by the cam teeth 47, 41, so that in its final position the clutch driving member 38 is shifted axially by a distance greater than the altitude of the clutch teeth. As shown in Fig. 8, the clearance "C" between the crests of the driving and driven teeth insures that the teeth will not re-engage with impact, as in the case of prior devices which rely on the separating action of the cam teeth alone.

After the tool assumes the condition as shown in Fig. 2 the operator must release forward pressure on the clutch shank 24, which results in compression of spring 36, by way of contact with the cam shaft 29 moving the clutch shank 24 forwardly, relative to the other parts of the tool, and disengages the clutch jaws 27 thereof from clutch jaws 39 of the driven element 38. During movement of the cam shaft 29 forwardly, under action of the compression spring 36, the conical cam portion 64 thereof will engage the corner edge 63 of the toggle levers 56, moving the toggle members 68 so that their lines of action are caused to pass through the axis of the pivot pins in an outwardly direction. As a result thereof the toggle levers will snap-out, and the compressive force of the spring 74 will force the driving element 46 forwardly so that the clutch teeth 47 thereof are again engaged with the clutch teeth 41 of the driven element 38. The parts of the tool will then be in the relative positions shown in Fig. 1, and will be ready for the next work piece tightening operation.

It will be noted that the various operating parts of the tool have a symmetrical design, so that satisfactory operation can be had in either direction of rotation of the motor.

From the foregoing it will be seen that the invention provides a threaded fastener setting tool with an automatic torque cut-off arrangement which satisfies the objectives set forth heretofore. While a specific embodiment has been presented, such is merely to illustrate a practical form of the invention. It may be possible to make certain changes without departing from the spirit of the invention, hence the invention is to be defined according to the scope of the following claims.

What is claimed is:

1. A power tool for setting threaded fasteners comprising a combination including a rotatable driven clutch element, a rotatable driving clutch element, said clutch elements being arranged for relative axial movement whereby positive engagement therebetween can be effected and further having cam engaging surfaces adapted to urge the clutch elements toward disengagement when a predetermined resistance to rotation is imposed upon one of the clutch elements, a toggle means rotatable with the clutch elements and adapted in one position of repose to maintain the clutch elements in engagement and in another position of repose to permit disengagement of the clutch elements, and a compression means arranged to exert a continuous force upon the toggle means.

2. A power tool for setting threaded fasteners according to claim 1, wherein a resilient means is compressively maintained between the clutch elements.

3. A power tool for setting threaded fasteners comprising a combination including a rotatable driven clutch element, a rotatable driving clutch element movable axially for engagement with the driven clutch element, said clutch elements having cam engaging surfaces adapted to urge the driving clutch element out of engagement with the driven clutch element when a predetermined resistance to rotation is imposed upon the driven clutch element, a toggle means being rotatable with the driving clutch element and adapted in one position of repose to maintain the driving clutch element in engagement with the driven clutch element and in another position of repose to permit disengagement of the driving clutch element from the driven clutch element, and a compression means arranged to exert a continuous force upon the toggle means.

4. A power tool for setting threaded fasteners according to claim 3, wherein a resilient means is compressively maintained between the clutch elements.

5. A power tool for setting threaded fasteners according to claim 4, wherein means are provided to adjust the amount of compression of the compression means.

6. A power tool for setting threaded fasteners comprising a combination including a housing, a spindle within the housing and rotatably driven by a power means, an intermediate driven clutch element rotatably mounted upon the spindle, a driving clutch element mounted upon the spindle for rotation therewith and movable axially for positive engagement with the intermediate driven clutch element, said clutch elements having cam engaging surfaces adapted to urge thhe driving clutch element out of engagement with the intermediate clutch element when a predetermined resistance to rotation is imposed upon the intermediate driven clutch element, a forward driven member slidably supported in a nose portion of the housing and having jaws engageable with jaws formed on the intermediate driven clutch element, a lever means mounted upon the spindle and adapted in one position of repose to maintain the driving clutch element in engagement with the intermediate clutch element and in another position of repose to permit disengagement of the driving clutch element from the intermediate driven clutch element, and a compression means surrounding the spindle and arranged to exert a continuous force upon the lever means.

7. A power tool for setting threaded fasteners according to claim 6, wherein a resilient means is compressively maintained between the driving clutch element and the intermediate driven clutch element.

8. A power tool for setting threaded fasteners according to claim 7, wherein said lever means comprises a toggle lever pivotally mounted to the spindle and movable in one position into engagement with the driving clutch element and in another position out of engagement with the driving clutch element, and a toggle pin which engages the toggle lever at one end and is exposed to the force of the compression means at the other end.

9. A power tool for setting threaded fasteners according to claim 8, wherein adjusting means are provided to regulate the compression of the compression means.

10. A power tool for setting threaded fasteners according to claim 9, wherein re-engagement means are provided for automatically moving the toggle lever to shift the driving clutch element into engagement with the intermediate driven clutch element.

11. A power tool for setting threaded fasteners according to claim 10, wherein said re-engagement means comprises a cam shaft slidably supported within the spindle and having a cam portion engageable with the toggle lever, and a helical spring compressively arranged between an end of the cam shaft and the spindle.

12. A power tool for setting threaded fasteners according to claim 11, wherein an abutment cap is slidingly arranged on the spindle between the driving clutch element and the toggle lever, said abutment cap being adapted to receive shims to regulate clearance between the cam engaging surfaces of the clutch elements when the latter are disengaged.

13. A power tool for setting threaded fasteners comprising a housing, a spindle within the housing rotatably driven by a motor means, a driven clutch element rotatably mounted upon the spindle, a driving clutch element mounted upon the spindle for rotation therewith and movable axially for positive engagement with the driven clutch element, said clutch elements having cam engaging teeth adapted to urge the driving clutch element out of engagement with the driven clutch element when a predetermined resistance to rotation is imposed upon the driven clutch element, a clutch shank mounted in a nose portion of the housing and having jaws which are adapted to engage jaws on the driven element when the clutch shank is forced against a threaded fastener to be set, a cam shaft supported in the spindle and compressively arranged in abutment with the clutch shank to urge the latter away from the driven clutch element, a plurality of toggle members mounted upon the spindle and adapted in one position of repose to maintain the driving clutch element in positive engagement with the driven clutch element and in another position of repose to permit disengagement of the driving clutch element from the driven clutch element, a spring compressively arranged between the clutch elements, a helical spring surrounding the spindle and compressively maintained to exert a continuous force upon the toggle members, and an adjusting means to regulate the degree of compression of the helical spring.

14. A power tool for setting threaded fasteners according to claim 13, wherein the cam engaging teeth have symmetrically sloped side surfaces to provide for clutch disengagement in either direction of spindle rotation.

15. A power tool for setting threaded fasteners according to claim 14, wherein the cam shaft has a cam portion movable to contact the toggle members to force the driving clutch element into re-engagement with the driven clutch element.

16. A power tool for setting threaded fasteners according to claim 15, wherein the driving clutch element will not re-engage with the driven clutch element until the jaws of the clutch shank are moved toward disengagement from the jaws of the driven clutch element.

References Cited in the file of this patent

UNITED STATES PATENTS

| | | |
|---|---|---|
| 2,259,824 | Lowder | Oct. 21, 1941 |
| 2,351,996 | Morgan | June 20, 1944 |
| 2,600,327 | Ridge | June 10, 1952 |
| 2,667,800 | Garwood | Feb. 2, 1954 |